(12) United States Patent
Metzler

(10) Patent No.: US 8,069,939 B1
(45) Date of Patent: Dec. 6, 2011

(54) BEACH CART SYSTEM

(76) Inventor: John Metzler, Severna Park, MD (US)

( * ) Notice: Subject to any disclaimer, the term of this patent is extended or adjusted under 35 U.S.C. 154(b) by 0 days.

(21) Appl. No.: 12/798,646

(22) Filed: Apr. 8, 2010

Related U.S. Application Data

(60) Provisional application No. 61/212,929, filed on Apr. 17, 2009.

(51) Int. Cl.
*B62B 3/00* (2006.01)
*B62D 51/04* (2006.01)

(52) U.S. Cl. .................. 180/19.3; 180/19.1; 280/47.35

(58) Field of Classification Search ........ 180/19.1–19.3, 180/65.1; 280/47.18, 47.19, 47.26, 47.34, 280/47.35, 79.11; D22/147, 148; 62/457.7, 62/441–442, 444, 371
See application file for complete search history.

(56) References Cited

U.S. PATENT DOCUMENTS

| | | | | |
|---|---|---|---|---|
| 2,772,113 A * | 11/1956 | Berard | ............ | 180/65.1 |
| 5,163,694 A * | 11/1992 | Reichek | ............ | 280/47.26 |
| 5,465,988 A * | 11/1995 | Dennis | ............ | 280/47.35 |
| 5,853,180 A * | 12/1998 | Taylor | ............ | 280/32.6 |
| 5,911,422 A * | 6/1999 | Carpenter et al. | ............ | 280/8 |
| 6,076,298 A | 6/2000 | Teel | | |
| 6,276,471 B1 * | 8/2001 | Kratzenberg et al. | ............ | 180/19.3 |
| 6,502,646 B2 | 1/2003 | Wiens | | |
| 6,533,298 B2 * | 3/2003 | Sims | ............ | 280/47.26 |
| 6,648,349 B1 * | 11/2003 | Waller et al. | ............ | 280/47.35 |
| 6,895,778 B1 | 5/2005 | Ackerman | | |
| 7,210,545 B1 * | 5/2007 | Waid | ............ | 180/65.1 |
| 7,384,051 B1 * | 6/2008 | Haire | ............ | 280/47.34 |
| 7,407,032 B1 * | 8/2008 | Chambers et al. | ............ | 180/312 |
| 2002/0070517 A1 * | 6/2002 | Ramsey | ............ | 280/47.19 |
| 2004/0216933 A1 * | 11/2004 | Coale | ............ | 180/19.1 |
| 2006/0208440 A1 * | 9/2006 | Clark et al. | ............ | 280/47.35 |
| 2008/0041644 A1 * | 2/2008 | Tudek et al. | ............ | 180/65.1 |
| 2008/0179847 A1 * | 7/2008 | DeFrancia | ............ | 280/47.26 |

* cited by examiner

*Primary Examiner* — Anne Marie M. Boehler
(74) *Attorney, Agent, or Firm* — Emery L. Tracy

(57) ABSTRACT

A beach cart system for transporting goods between locations is provided. The beach cart system comprises a lower cart portion having a first recessed area and a second recessed area. An upper cart portion having at least one storage bay is receivable within the first recessed area. A front cart portion having at least one insulated cup holder is receivable within the second recessed area. A plurality of wheels is secured to the lower cart portion. A motor is secured to the lower cart portion for driving the wheels. A handle for steering the beach cart system is attached to the lower cart portion and has controls for controlling operation of the motor.

19 Claims, 2 Drawing Sheets

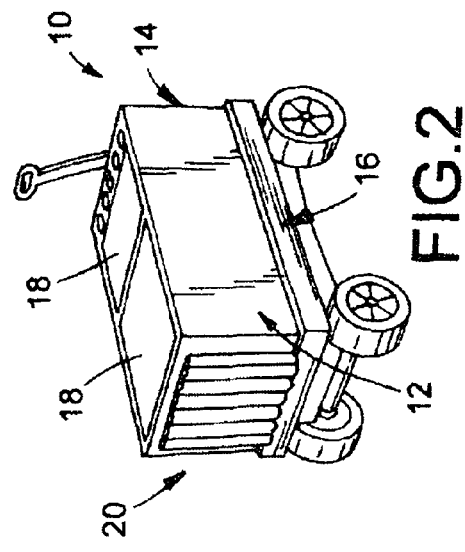
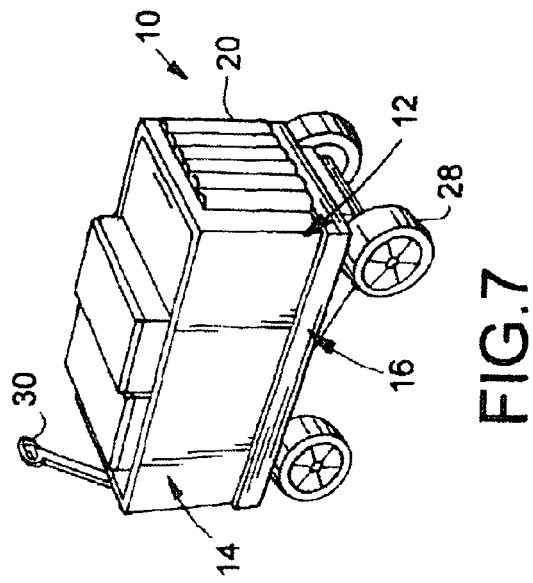
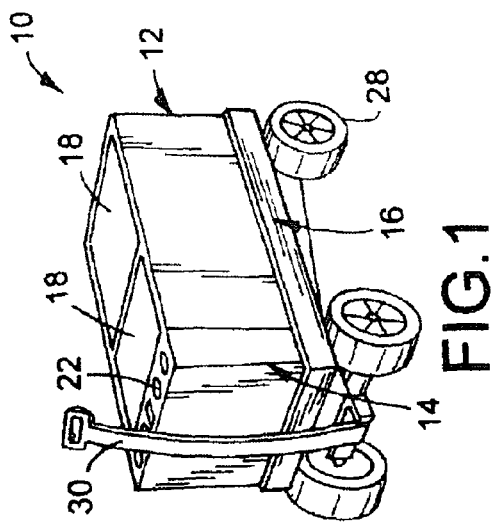
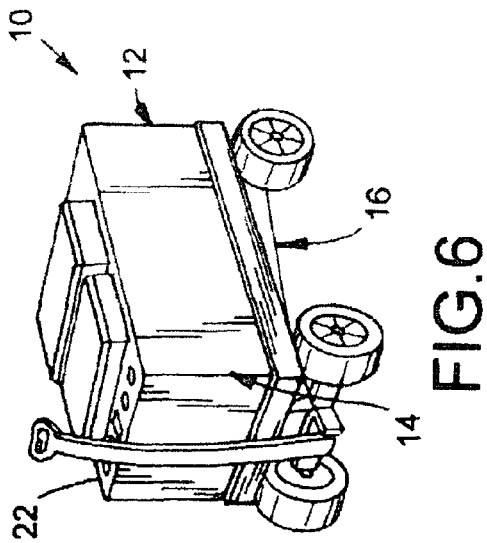

BEACH CART SYSTEM

The present application claims the benefit of priority of pending provisional patent application Ser. No. 61/212,929, filed on Apr. 17, 2009, entitled "Beach Cart".

BACKGROUND OF THE INVENTION

1. Field of the Invention

This invention relates generally to a beach cart system and, more particularly, the invention relates to a beach cart system enabling users to easily transport goods from their car to the beach.

2. Description of the Prior Art

A favorite summer pastime enjoyed by millions of Americans is going to a beach, lake, pool or water park. Basking in the sun, swimming for hours and enjoying the outdoors, a day spent beside the water can help ease the stresses of daily life and can leave one tanned, relaxed and well rested. Most people who plan on spending a day beachside pack a bag full of snack foods, a cooler full of icy beverages and sun lotion, while families with children also must pack an arsenal of toys, "boogie" and "skin" boards, buckets, and shovels in order to keep their tots happy. Additionally, most beach goers find it necessary to bring along a large blanket and one or two beach chairs before heading off to the beach. These items are particularly useful in that they provide the sun-worshipers comfortable spot to sit back and enjoy the sun's rays, as well as an area free of sand or debris on which belongings can be neatly stored.

Although spending an afternoon at the beach can be fun and relaxing, doing so is not without drawbacks. Specifically, hauling the plethora of items necessary for a day in the sun, from the car to a particular spot on the sand, can be a time-consuming and frustrating task. Trekking across hot sand and making several trips to the car in order to transport heavy coolers, blankets, boogie boards, skin boards, toys, and beach chairs, all while trying to keep an eye on small children and goods left unattended on the beach, can leave one feeling exhausted before the day's activities have even begun. Additionally, after spending long hours soaking up the sun, riding the waves and swimming, packing up heavy beach goods and dragging them back to the car is the last thing most people want to do. While some consumers employ wagons or other types of storage carts to transport goods, these vehicles do not always roll easily over sandy terrain. Simply stated, attempting to steer a loaded cart across sand, pebbles or gravel can be extremely difficult, often meeting with so much resistance that use of a cart is simply not an option. For consumers who wish to spend an afternoon basking on a sandy beach with friends, doing so often means they must be transport goods and supplies manually.

SUMMARY

The present invention includes a beach cart system for transporting goods between locations. The beach cart system comprises a lower cart portion having a first recessed area and a second recessed area. An upper cart portion having at least one storage bay is receivable within the first recessed area. A front cart portion having at least one insulated cup holder is receivable within the second recessed area. A plurality of wheels is secured to the lower cart portion. A motor is secured to the lower cart portion for driving the wheels. A handle for steering the beach cart system is attached to the lower cart portion and has controls for controlling operation of the motor.

The present invention further includes a method for transporting goods between two points. The method comprises providing a lower cart portion, forming a first recessed area in the lower cart portion, forming a second recessed area in the lower cart portion, providing an upper cart portion having at least one storage bay, positioning the upper cart portion within the first recessed area, providing a front cart portion having at least one insulated cup holder, positioning the front cart portion within the second recessed area, securing a plurality of wheels to the lower cart portion, securing a motor to the lower cart portion, driving the wheels with the motor, securing a handle to the lower cart portion, and controlling operation of the motor with the handle.

BRIEF DESCRIPTION OF THE DRAWINGS

FIG. 1 is a front perspective view illustrating a beach cart system, constructed in accordance with the present invention;

FIG. 2 is rear perspective view illustrating the beach cart system of FIG. 1, constructed in accordance with the present invention;

FIG. 6 is a front perspective view illustrating another embodiment of the beach cart system, constructed in accordance with the present invention; and FIG. 7 is a rear perspective view illustrating the beach cart system of FIG. 6, constructed in accordance with the present invention.

DETAILED DESCRIPTION OF THE PREFERRED EMBODIMENTS

Figure 3:
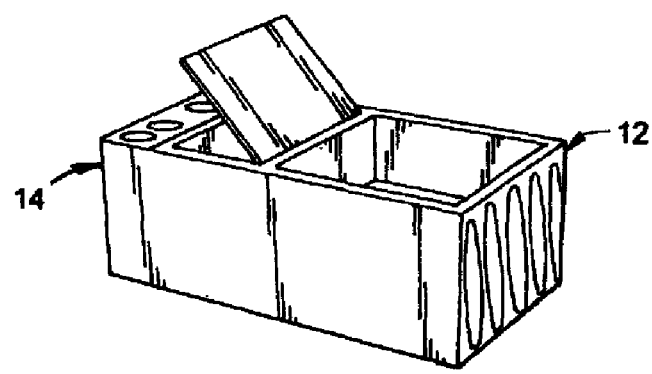
FIG. 3 is a perspective view illustrating an upper cart portion of the beach cart system of FIG. 1, constructed in accordance with the present invention.
Figure 4:
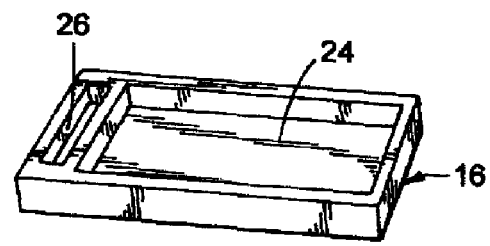
FIG. 4 is a perspective view illustrating an assembled lower cart portion and front cart portion of the beach cart system of FIG. 1, constructed in accordance with the present invention.
Figure 5:
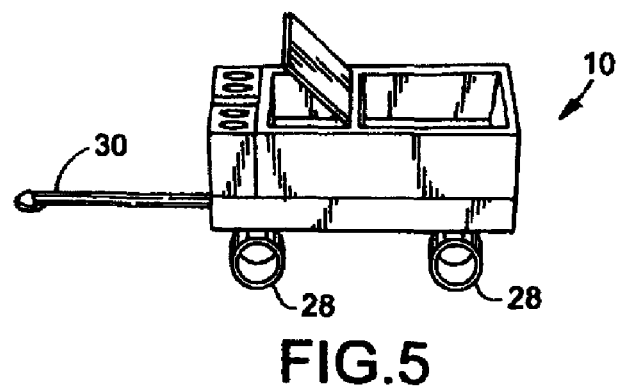
FIG. 5 is a perspective view illustrating the upper cart portion, the front cart portion, and the lower cart portion of FIGS. 3 and 4 assembled into the beach cart system of FIG. 1, constructed in accordance with the present invention.

As illustrated in FIGS. 1-7, the present invention is a beach cart system, indicated generally at 10, for users to easily transport goods from their car to the beach. While the beach cart system 10 of the present invention is a specially designed motorized wagon, configured specifically for beach and other outdoor use, the beach cart system 10 can be used for any purpose where it is necessary to transport items and goods.

Preferably, the beach cart system 10 of the present invention is a rectangular shaped unit manufactured primarily of sturdy plastic material and featuring metal and electronic components. Measuring an ample four feet six inches (4' 6") in length by two feet one'inch (2' 1") in height and two (2') feet in width, the beach cart system 10 measures approximately fourteen (14") inches in total depth. It should be noted that while particular dimensions are presented for the beach cart system 10, it is within the scope of the present invention for the beach cart system 10 to have greater dimensions or lesser dimensions than those described and illustrated herein. The beach cart system 10 can be produced in a myriad of attractive colors.

The beach cart system 10 of the present invention comprises an upper cart portion 12, a front cart portion 14, and a lower cart portion 16. The upper cart portion 12 of the beach cart system 10 is comprised of an open storage bay surrounded by four side walls. The side walls can be varying heights to accommodate different storage needs. In an embodiment of the present invention, as best illustrated in FIGS. 1-5, the upper cart portion 12 can have two compartments 18. The first compartment can be a cooler having a hinged or removable lid and the second compartment can be a dry storage bin having a hinged or removable lid. The dry storage bin of the beach cart 10 preferably measures approximately three feet six inches (3' 6") in total length thus easily accommodating a plethora of towels, toys, and beach gear. In another embodiment, as best illustrated in FIGS. 6 and 7, the upper cart portion 12 can have a plurality of removable coolers. In both embodiments, a plurality of elongated tubes 20 can be formed on the upper cart portion 12 for receiving fishing rod, umbrellas, and the like.

Positioned on the front end of the upper cart portion 12 of the beach cart system 10 of the present invention is the front end portion 14. The front end portion 14 is preferably an insulated cooler preferably measuring fourteen (14") inches in height, one foot ten inches (1' 10") in width and one (1') foot in length. Four, insulated cup holders 22 are formed in the front cart portion 14 with also at least one ample storage compartment designed to house keys, wallets, and other small accessory items.

As with traditional coolers, all components of the beach cart system 10 of the present invention are preferably constructed of insulated plastic material and sized appropriately to store an ample supply of snacks, beverages and other foods. A simple drainage valve can be positioned on each of the compartments or coolers allowing drainage of excess liquid. The exterior walls of the coolers preferably rest flush with the sidewalls, thus ensuring a snug and stable fit during use.

The lower cart portion 16 of the beach cart system 10 of the present invention contains all of the electronics and wiring for propelling the beach cart system 10. In addition, the lower cart portion 16 has a first recessed area 24 for snugly receiving the upper cart portion 12 and a second recessed area 26 for snugly receiving the front cart portion 14. In addition, the lower cart portion 16 includes four, heavy duty wheels 28. Notably, the oversized wheels 28 boast a heavy tread and are connected to a motor housed within the lower cart portion 16, thus easily traversing across the sandiest terrain. The motor itself is connected to all four wheels 28, affording four-wheel drive control and powered by a rechargeable battery. For optimal control and steerage of the beach cart system 10, the front two wheels 28 of the beach cart system 10 are preferably secured to a moving axle and pivot-style bolt, culminated in an elongated handle 30. The elongated handle 30 can include all of the controls for the motor such as go and stop plus speed controls, if desired.

As noted above, the upper cart portion 12 and the front cart portion 14 are releasably received within the first recessed area 24 and the second recessed area 26, respectively, of the lower cart portion 16. If necessary, in the alternative or for further strength, clasps or the like can be provided to secure each of the portions together.

The manner of use of the beach cart system 10 of the present invention will now be described. It will be understood by those skilled in the art that the manner of use of the beach cart system 10 described herein is merely one method of use and other methods of use of the beach cart system 10 are within the scope of the present invention.

Use of the beach cart system 10 of the present invention is very simple and straightforward. First, the user packs the beach cart in their car or trunk, along with other necessary items such as a beach toys, boogie boards, and beach chairs. Loading the integrated coolers of the beach cart system 10 with snacks, beverages and ice, the user heads off for a day at the beach. Upon arrival, the user sets the assembled beach cart system 10 on the ground, loading the beach cart system 10 with all of their beach gear. Next, the user grasps the beach cart system 10 by the elongated handle and pulls the wagon, along with all stored goods, to a desired destination along the shore. For those seeking shade, a standard beach umbrella can be slid into one of the beach cart system's 10 upright, elongated slots, thereby providing protection from the direct rays of the sun. The user then unloads the beach cart system 10, setting blankets, towels, and beach chairs on the sand, or the user can simply remove any desired items as needed, from the beach cart system 10 At the end of the day, the user packs all of their belongings back into the beach cart system 10, rolls the beach cart system 10 back to their vehicle, and the beach cart system 10, along with stored goods, is placed in the trunk for the ride home. After use, any excess sand or debris can be easily brushed or rinsed off and the beach cart system 10 can be stored until again needed.

The beach cart system 10 of the present invention offers users many significant benefits and advantages. Foremost, the beach cart system 10 provides beach goers a simple and efficient means of transporting their goods to the beach. Eliminating the need to make several trips from the car to the beach, simply to unload a day's worth of beach accessories, the beach cart system 10 holds a myriad of large and small accessories necessary for a day in the sun. Users will appreciate that with the beach cart system 10, they can transport the beach cart's full sized cooler, sand pails and other toys, blankets, towels and even a beach chair and umbrella, all in one trip. Additionally, because users can transport all of their beach goods at one time, use of the beach cart system 10 eliminates the worry associated with leaving transported goods and children unattended while returning to the vehicle for another load. Sparing the beach user the exhausting hassle of trekking across burning, thick sand in order to transport all necessary items to the beach, the beach cart system 10 proves particularly useful for those who suffer back pain or limited mobility. With heavy duty, threaded wheels, the motorized beach cart system 10 can be easily pulled along, even over the thickest, wet sand. Although designed with the beach user in mind, the beach cart system 10 will also be well suited for use by campers, hunters, sports fans, and other outdoor enthusiasts. Perfect for use in hauling a tent, camping equipment, or hunting and fishing gear, the beach cart system 10 can also be utilized to transport chairs and other accessories for an afternoon tailgate party or similar outdoor event.

Practical and unique, the beach cart system 10 of the present invention enables consumers to effortlessly transport a variety of goods in an efficient manner. Durably constructed and versatile, the beach cart system 10 proves invaluable for any outdoor enthusiast.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:
1. A beach cart system for transporting goods between two points, the beach cart system comprising:

a lower cart portion having a first recessed area and a second recessed area;

an upper cart portion having at least one storage bay, the upper cart portion releasably receivable within the first recessed area, the upper cart portion having a solid outer wall;

a front cart portion having at least one insulated cup holder, the front cart portion releasably receivable within the second recessed area, the front cart portion having a solid outer wall;

a plurality of wheels secured to the lower cart portion;

a motor secured to the lower cart portion for driving the wheels; and a handle attached to the lower cart portion for steering the beach cart system, the handle having controls for controlling operation of the motor;

wherein upon positioning the upper cart portion within the first recessed area and the front cart portion in the second recessed area, the solid outer wall of the upper cart portion is flush with the solid outer wall of the front cart portion; and wherein only the wheels extend beyond the outer extent of the lower cart portion along sides of the beach cart system.

2. The beach cart system of claim 1 wherein the upper cart portion is releasably held within the first recessed area with friction and wherein the front cart portion is releasably held within the second recessed area with friction.

3. The beach cart system of claim 1 wherein the upper cart portion has two removable compartments, a first compartment being an insulated cooler, a second compartment being a dry storage bin.

4. The beach cart system of claim 1 wherein the upper cart portion has a plurality of removable insulated coolers.

5. The beach cart system of claim 1 and further comprising:
a plurality of elongated tubes formed on the upper cart portion, the tubes positioned opposite the handle on a rear area of the upper cart portion only.

6. The beach cart system of claim 1 wherein the front end portion has four, insulated cup holders and at least one additional storage compartment.

7. The beach cart system of claim 1 and further comprising:
at least one drainage valve formed in the upper cart portion.

8. The beach cart system of claim 1 wherein the lower cart portion contains all of the electronics and wiring for propelling the beach cart system.

9. A method for transporting goods between two points, the method comprising:
providing a lower cart portion;
forming a first recessed area in the lower cart portion;
forming a second recessed area in the lower cart portion;
providing an upper cart portion having at least one storage bay, the upper cart portion having a solid outer wall;
releasably positioning the upper cart portion within the first recessed area;
providing a front cart portion having at least one insulated cup holder, the front cart portion having a solid outer wall;
releasably positioning the front cart portion within the second recessed area;
positioning the solid outer wall of the upper cart portion flush with the solid outer wall of the front cart portion;

securing a plurality of wheels to the lower cart portion;
securing a motor to the lower cart portion;
driving the wheels with the motor;
securing a handle to the lower cart portion; and
controlling operation of the motor with the handle.

10. The method of claim 9 and further comprising:
releasably securing the upper cart portion within the first recessed area with friction; and
releasably securing the front cart portion within the second recessed area with friction.

11. The method of claim 9 wherein the upper cart portion has two removable compartments, a first compartment being an insulated cooler, a second compartment being a dry storage bin.

12. The method of claim 9 wherein the upper cart portion has a plurality of removable insulated coolers.

13. The method of claim 9 and further comprising:
forming a plurality of elongated tubes on the upper cart portion opposite the handle on a rear portion of the upper portion only.

14. The method of claim 9 wherein the front end portion has four, insulated cup holders and at least one additional storage compartment.

15. The method of claim 9 and further comprising:
forming at least one drainage valve in the upper cart portion.

16. A beach cart system for transporting goods between two points, the beach cart system comprising:
a lower cart portion having a first recessed area and a second recessed area;
an upper cart portion having at least one storage bay, the upper cart portion releasably secured within the first recessed area;
a plurality of elongated tubes formed on the upper cart portion, the tubes positioned opposite a handle on a rear area of the upper cart portion only;
a front cart portion having at least one insulated cup holder, the front cart portion releasably secured within the second recessed area;
a plurality of wheels secured to the lower cart portion;
a motor secured to the lower cart portion for driving the wheels;
the handle secured to the lower cart portion for steering the beach cart system, the handle having controls for controlling operation of the motor;
wherein the upper cart portion has a solid outer wall and the front cart portion has a solid outer wall, and;
wherein upon positioning the upper cart portion within the first recessed area and the front cart portion in the second recessed area, the solid outer wall of the upper cart portion is flush with the solid outer wall of the front cart portion.

17. The beach cart system of claim 16 wherein the upper cart portion has two removable compartments, a first compartment being an insulated cooler, a second compartment being a dry storage bin.

18. The beach cart system of claim 16 wherein the upper cart portion has a plurality of removable insulated coolers.

19. The beach cart system of claim 16 wherein only the wheels extend beyond the outer extent of the lower cart portion along sides of the beach cart system.

* * * * *